Sept. 15, 1925.
1,553,944

J. A. LAUGHLIN

GRAIN HEATER

Filed March 7, 1924

Inventor.
James A. Laughlin
by H. J. S. Dennison
Atty.

Patented Sept. 15, 1925.

1,553,944

UNITED STATES PATENT OFFICE.

JAMES A. LAUGHLIN, OF TORONTO, ONTARIO, CANADA.

GRAIN HEATER.

Application filed March 7, 1924. Serial No. 697,573.

*To all whom it may concern:*

Be it known that I, JAMES A. LAUGHLIN, a subject of the King of Great Britain, and resident of the city of Toronto, county of York, Province of Ontario, in the Dominion of Canada, have invented certain new and useful Improvements in a Grain Heater, as described in the following specification and illustrated in the accompanying drawings that form part of the same.

The principal object of the invention is to devise a structure of heater through which the grain will flow uniformly and in which the entire heating surface will be intimately associated with the grain in actual physical contact.

A further object is to effect an economy in the fuel used for heating grain and a still further object is to devise a structure in which the grain cannot become cooked or burnt but will flow uniformly and will not clog.

The principal feature of the invention consists in the arrangement of steam heated tubes of rectangular cross section with their side walls spaced equally from the adjacent tubes and forming a series of interlacing diagonal passage-ways.

Figure 1:
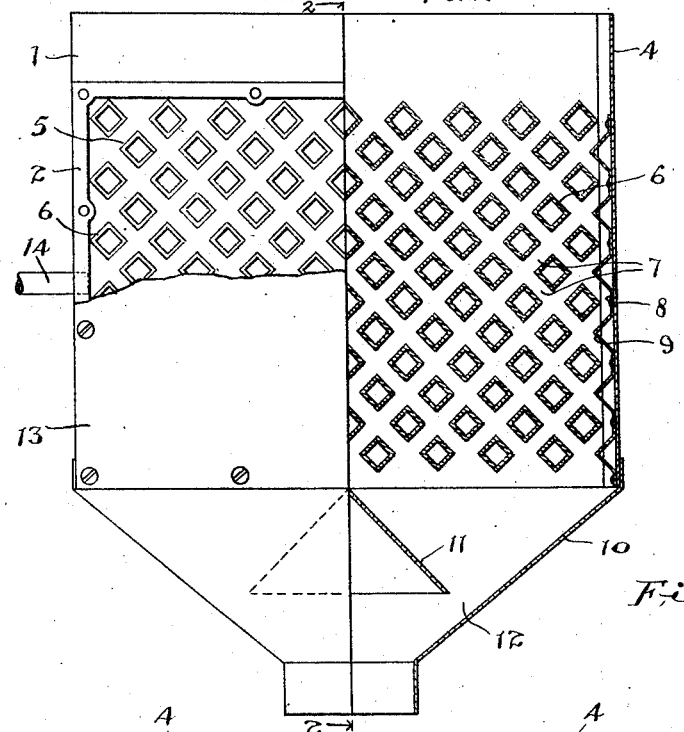

In the drawings, Figure 1 is an elevational view shown partly in vertical section transversely of the steam tubes, a portion of the cover of the steam chest being broken away.

Figure 2:
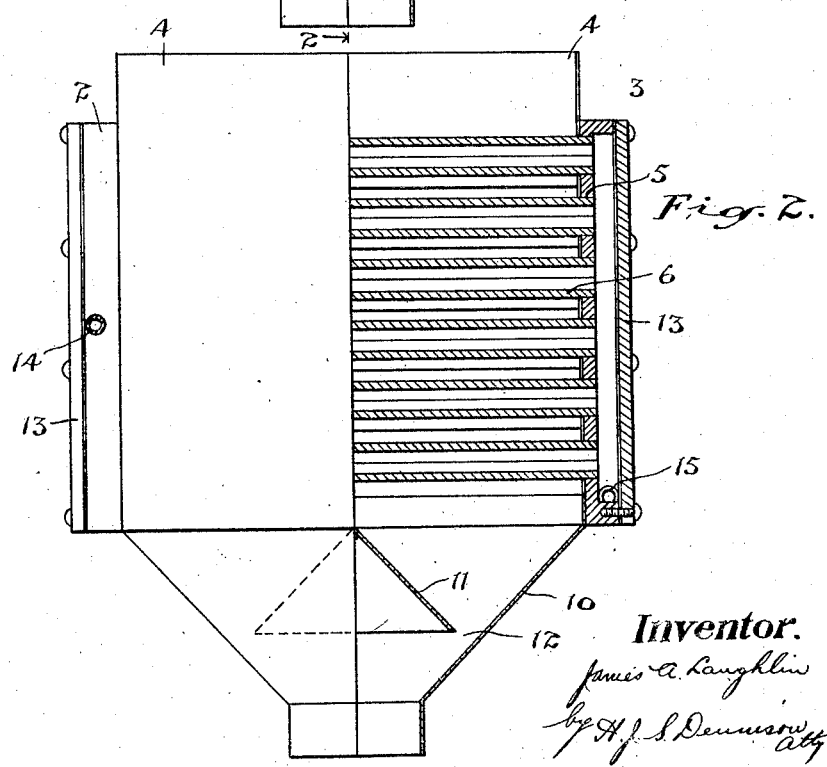

Figure 2 is an elevational view partly in vertical section through the line 2—2 of Figure 1.

It has been proposed to construct grain heaters with tubes extending horizontally between steam chests but none of these have been capable of presenting their entire surfaces to the grain in passage and it is the purpose of this invention to produce a structure in which no particle of grain can lodge and become overheated and yet all the grain will be brought into active contact with a heating surface in such a manner as to thoroughly heat it, thus avoiding the cooking or burning which is detrimental to the making of first grade flour.

In the construction herein shown the heater casing 1 is of rectangular form constructed of a pair of flat hollow casings 2 and 3 arranged on opposite sides and joined by the sheet metal plates 4 which space them apart.

The inner walls of the casings 2 and 3 are formed with quadrangular-shaped openings 5 arranged with their diagonals vertically and horizontally and in these holes are secured quadrangular-shaped tubes 6, the ends of said tubes being welded or flanged at their ends to form steam tight joints with the casings.

The tubes thus extending across the heater casing form a plurality of cross diagonal passages 7 and the grain directed into the top of the heater casing is directed through these diagonal passages in contact with the flat faces of the tubes and no matter in which direction the grain flows all surfaces of the tubes will be engaged thereby and there is no possibility of the grain lodging on top of the tubes and the arrangement of diagonal passages ensures the grain passing underneath each individual tube.

Sheet metal plates 8 formed with triangular shaped ribs 9 of corresponding register to the spacing of the tubes are secured to the side plates 4 so as to direct the grain inwardly from the side walls to the diagonal passages and these plates preferably overlap the alternate tubes adjacent thereto to obviate the possibility of any grain passing directly down the outer side wall.

A hopper 10 is arranged at the bottom of the casing 1 and a pyramid-shaped guard 11 is arranged centrally of the hopper immediately below the bottom tubes extending transversely in the same direction as the tubes. This inclination of the guard is substantially the same as the side wall of the hopper so that the grain flowing either to the centre or to the outer side of the hopper will be directed with a uniform flow to the openings 12 leading to the outlet from the hopper.

Cover plates 13 are removably secured on the outer sides of the steam chests and these can be readily removed for cleaning the interior of the tubes or repairing same if necessary.

A steam inlet pipe 14 leads to one of the chests intermediate of its height and an exhaust pipe 15 leads from the bottom of the other chest so that any condensation will be drained thereby.

The heat flowing into the inlet chest passes through the tubes uniformly heating them all alike and the grain striking the bevelled surface of the upper rows of tubes is divided evenly and directed down the diagonal passages flowing uniformly through the heater and absorbing the heat therefrom.

Heaters constructed according to this invention have proven to be very effective and economical in operation. The grain is heated to a uniform temperature and without danger of overheating.

What I claim as my invention is:—

1. In a grain heater, a rectangular vertical casing having closed steam chests on opposite sides, a plurality of quadrangular shaped imperforate tubes extending horizontally between and communicating with said steam chests and arranged in uniformly staggered vertical rows with perpendicular and horizontal diagonals forming intersecting diagonal passages.

2. In a grain heater, a rectangular vertical casing having steam chests on opposite sides, a plurality of quadrangular shaped tubes extending horizontally between said steam chests and arranged in uniformly staggered vertical rows with perpendicular and horizontal diagonals forming intersecting diagonal passages, a hopper at the bottom of said casing having a central outlet, and a guard arranged centrally in said hopper and parallel with said tubes.

3. In a grain heater, a rectangular vertical casing having steam chests on opposite sides, a plurality of quadrangular shaped tubes extending horizontally between said steam chests and arranged in uniformly staggered vertical rows with perpendicular and horizontal diagonals forming intersecting diagonal passages, a hopper at the bottom of said casing having a central outlet, and a guard arranged centrally in said hopper and parallel with said tubes, said guard dividing the upper part of the hopper into a pair of hoppers of uniform dimensions and regulating the flow of grain through the heater.

4. A grain heater comprising a pair of flat hollow metal casings spaced apart and having their inward walls perforated with quadrangular orifices arranged in diagonal rows with their corners perpendicular and horizontally arranged, a plurality of quadrangular shaped imperforate tubes secured in said orifices and extending between and connecting said casings and forming a plurality of diagonally intersecting passages, a steam inlet entering one of said casings and an exhaust outlet in the opposite casing communicating with the bottom thereof, metal sheets joining said casings, and transversely ribbed plates secured to the aforesaid sheets and arranged intermediate of the rows.

JAMES A. LAUGHLIN.